US008746287B2

(12) United States Patent
Dorr et al.

(10) Patent No.: US 8,746,287 B2
(45) Date of Patent: Jun. 10, 2014

(54) DUAL PISTON ACCUMULATOR

(75) Inventors: Walter Dorr, Völklingen (DE); Herbert Baltes, Losheim (DE); Peter Kloft, Ransbach-Baumbach (DE)

(73) Assignee: Hydac Technology GmbH, Sulzbach/Saar (DE)

( * ) Notice: Subject to any disclaimer, the term of this patent is extended or adjusted under 35 U.S.C. 154(b) by 0 days.

(21) Appl. No.: 13/261,485

(22) PCT Filed: Apr. 27, 2011

(86) PCT No.: PCT/EP2011/002100

§ 371 (c)(1),
(2), (4) Date: Nov. 16, 2012

(87) PCT Pub. No.: WO2011/134646

PCT Pub. Date: Nov. 3, 2011

(65) Prior Publication Data

US 2013/0068333 A1 Mar. 21, 2013

(30) Foreign Application Priority Data

Apr. 30, 2010 (DE) ........................ 10 2010 018 885

(51) Int. Cl.
*F16L 55/04* (2006.01)

(52) U.S. Cl.
USPC .............................................. 138/31; 138/30

(58) Field of Classification Search
USPC ..................................................... 138/31, 30
See application file for complete search history.

(56) References Cited

U.S. PATENT DOCUMENTS

| | | | | |
|---|---|---|---|---|
| 2,743,741 | A * | 5/1956 | Ord | 138/31 |
| 2,937,663 | A * | 5/1960 | Ashton et al. | 138/31 |
| 3,918,498 | A * | 11/1975 | Schneider | 138/31 |
| 4,649,704 | A * | 3/1987 | Marsh | 60/415 |
| 4,765,366 | A * | 8/1988 | Premiski et al. | 137/593 |
| 4,777,800 | A * | 10/1988 | Hay, II | 60/593 |
| 6,202,753 | B1 * | 3/2001 | Baugh | 166/364 |
| 6,418,970 | B1 * | 7/2002 | Deul | 138/31 |
| 7,520,129 | B2 * | 4/2009 | Springett | 60/398 |
| 8,479,774 | B2 * | 7/2013 | Baugh | 138/31 |

FOREIGN PATENT DOCUMENTS

| | | |
|---|---|---|
| DE | 10 2005 060 994 A1 | 6/2007 |
| GB | 2 155 105 A | 9/1985 |

* cited by examiner

*Primary Examiner* — Patrick F Brinson
(74) *Attorney, Agent, or Firm* — Roylance, Abrams, Berdo & Goodman, L.L.P.

(57) ABSTRACT

A dual piston accumulator, in particular for a hydrostatic hybrid drive system for vehicles, replaces a high pressure hydro accumulator and a low pressure hydro accumulator. Inside a single accumulator housing (2) extending in the axial direction in a single piece over a high pressure part (4) and a low pressure part (6), an accumulator piston (8, 10) defines a high pressure-sided fluid chamber (16) and a low pressure-sided fluid chamber (18). Both chambers border an intermediate piece (12) separating the high pressure side (4) from the low pressure side (6). A common piston rod (14) extends through the intermediate piece for both accumulator pistons (8, 10). The wall width of the housing (2) corresponding to the high pressure part (4) is greater than the opposite reduced wall width corresponding to the low pressure part (6).

19 Claims, 4 Drawing Sheets

DUAL PISTON ACCUMULATOR

FIELD OF THE INVENTION

The invention relates to a dual piston accumulator, which is provided, in particular, in a hydrostatic hybrid drive system for vehicles to replace a high pressure hydraulic accumulator and a low pressure hydraulic accumulator.

BACKGROUND OF THE INVENTION

In light of the scarcity of natural resources and the increasing impact of $CO_2$ on the environment, the current trend in automotive engineering is to use hybrid drive systems, which store the electric energy generated in braking modes and recover drive energy from the stored energy to provide assistance to the vehicle for the drive mode and, in particular, for accelerating processes. This strategy offers the possibility of decreasing the drive power of the internal combustion engine, which serves as the primary drive, for comparable road performance. The result of such "downsizing" is not only a reduction in the fuel consumption, but it also raises the possibility of assigning the vehicles concerned to a lower emissions class that satisfies a lower-cost road tax category.

These goals are not limited to electric motor powered hybrids, but used for hydrostatic hybrid systems owing to the high energy density of hydraulic systems. Such a hydrostatic drive system with recovery of the braking energy is disclosed, for example, in DE 10 2005 060 994 A1.

The operational performance of such a hydrostatic hybrid system can be optimized by using a dual piston accumulator, instead of a high pressure hydraulic accumulator and a separate low pressure hydraulic accumulator. This approach permits the design to be more compact, as compared to a design using separate accumulators. In addition to compactness, the current trend is to reduce the structural weight as much as possible for systems that are installed into vehicles. Dual piston accumulators of the conventional design type, as described, for example, in U.S. Pat. No. 6,202,753 B1 for use in deep water drilling operations, do not meet these requirements.

SUMMARY OF THE INVENTION

An object of the present invention is to provide an improved dual piston accumulator that is compact and has extremely low structural weight.

This object is basically achieved with a dual piston accumulator where the wall thickness of the accumulator housing corresponding to the high pressure component is greater than the opposite reduced wall thickness that corresponds to the low pressure component. Not only does this feature reduce the weight of the accumulator housing, but it also uses the material of the housing in an optimal way in that the wall thickness in the high pressure component is adapted to the pressure level corresponding to the high pressure side, whereas the wall thickness in the low pressure component corresponding to the low pressure level prevailing in the low pressure component is considerably less. Since the accumulator housing still extends in one piece over the high pressure component and the low pressure component of the accumulator, this design not only is lightweight, but the module is as compact as possible.

Especially advantageously the accumulator housing is a one-piece component that forms an inner cylinder extending continuously without a shoulder from the high pressure component to the low pressure component. Both accumulator pistons exhibiting the same piston diameter are guided in the housing. The component with a continuous inner cylinder without a shoulder can be produced as a deep drawn part or as a stamping part in such that its weight is significantly reduced.

Especially advantageously the intermediate piece is fastened on the end region of that section of the inner cylinder that exhibits the greater wall thickness. Owing to the connection of the intermediate piece to the housing section exhibiting the greater wall thickness, a structurally rigid securing of the intermediate piece is ensured.

Especially advantageously the intermediate piece is an annular body with a radially external cylindrical surface resting against the inner surface of the inner cylinder to form a seal and connected therewith at least at one attachment point.

The arrangement can be configured in such a way that the cylindrical surface of the intermediate piece has at least one depression, preferably an annular groove. A notch formed in the housing wall engages the depression. This arrangement positionally secures the intermediate piece at a low production cost.

As an alternative, at least one radial borehole may be provided for positionally securing the intermediate piece in the cylindrical surface of the intermediate piece. A mounting bolt or a mounting screw inserted or screwed in from the outside of the accumulator housing can penetrate this radial borehole.

Furthermore, the wall of the inner cylinder and the cylindrical surface of the intermediate piece may have mutually aligned depressions for the engagement of an insert ring.

In such arrangements, the annular body of the intermediate piece can have two annular body parts screwed together. In this case, each annular body part forms a part of the cylindrical surface resting against the inner cylinder, where the depression in the cylindrical surface of the one annular body part is open in the direction of the other annular body part and can be closed by the other annular body part. In this design, the assembly may be performed such that the inlay part is moved into position on an annular body part before the intermediate piece is completed with the second annular body part.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

Figure 1:
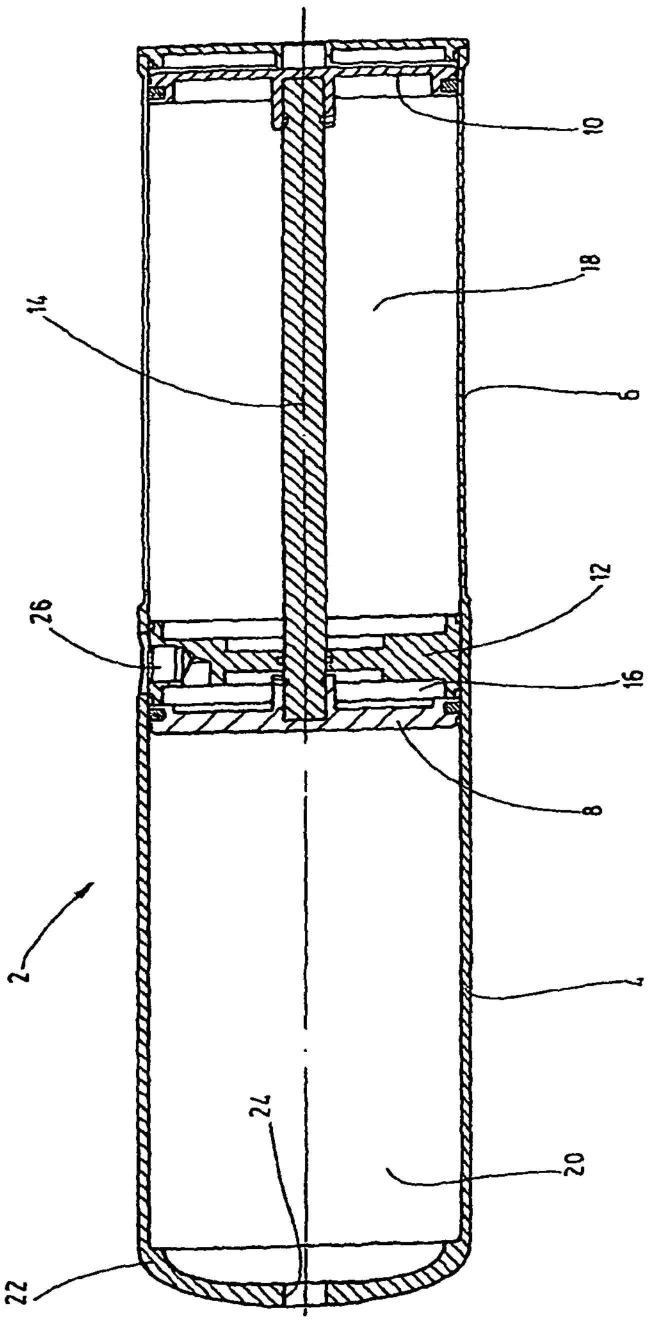
FIG. 1 is a side elevational view in section of a dual piston accumulator according to an of an exemplary embodiment of the invention that is scaled down in size by about a factor of 4 compared to a practical embodiment, where the piston positions correspond to the unloaded state of the high pressure side.
Figure 2:
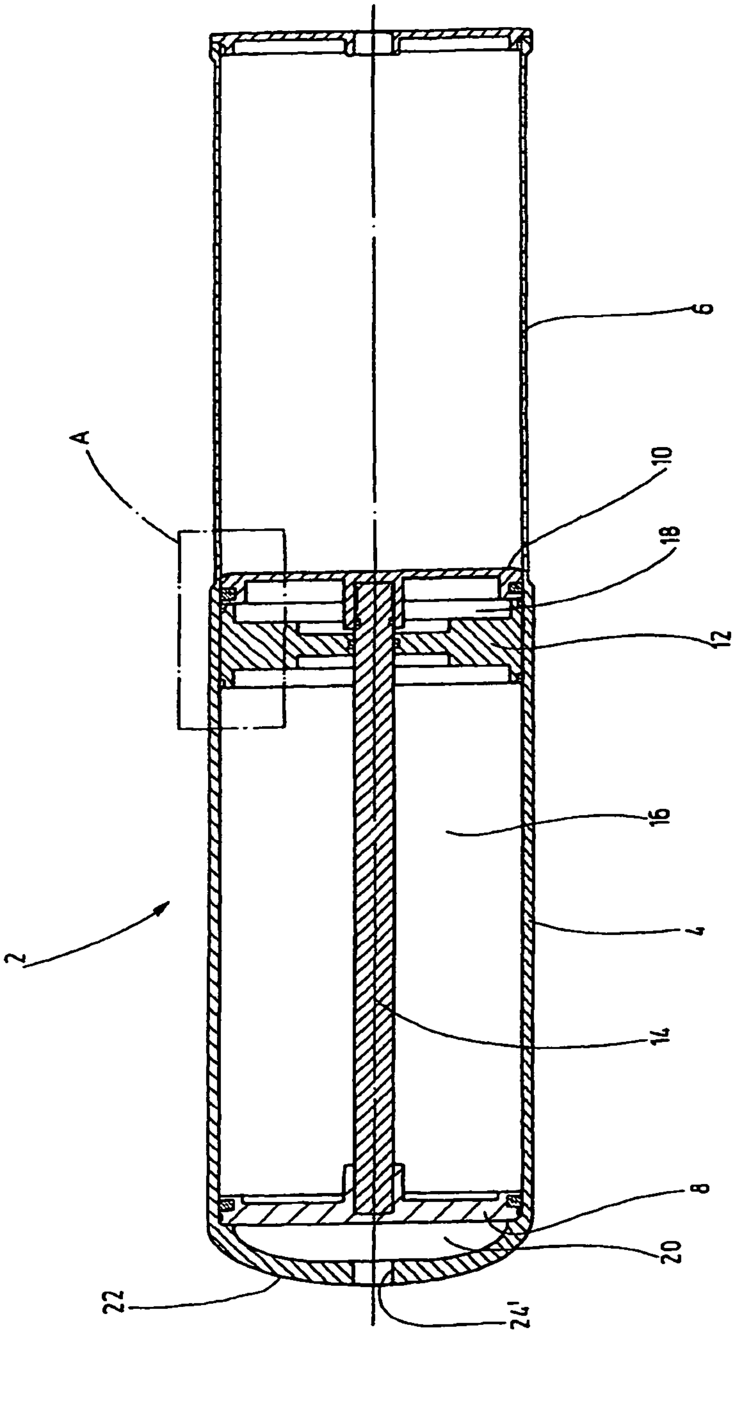
FIG. 2 is a top plan view in section, rotated by 90° about the longitudinal axis and with piston positions that correspond to the largest volume of the fluid chamber of the high pressure side.

FIGS. 1 and 2 show a dual piston accumulator according to an exemplary embodiment of the invention with an accumulator housing 2. The accumulator housing 2 forms an inner cylinder designed in one piece extending continuously from a high pressure side 4 without a shoulder, that is, with a constant inside diameter, as far as to a low pressure side 6. In this case, a high pressure-side accumulator piston 8 and a low pressure-side accumulator piston 10 are guided such that they can be axially displaced in the inner cylinder. The high pressure side 4 and the low pressure side 6 are separated from each other in a fluid-tight manner by an intermediate piece 12 fixed in the inner cylinder. A piston rod 14 is connected to both accumulator pistons 8, 10 and extends in a fluid-tight manner through the intermediate piece 12. FIG. 1 shows the piston positions in which a high pressure-side fluid chamber 16 between the accumulator piston 8 and the intermediate piece 12 has its smallest volume, while a low pressure-side fluid chamber 18 between the accumulator piston 10 and the intermediate piece 12 has its largest volume. FIG. 1 corresponds to the completely unloaded state. In contrast, FIG. 2 shows piston positions corresponding to the loaded state. In this case, the low pressure-side fluid chamber 18 has the smallest volume; and the high pressure-side fluid chamber 16 has the largest volume. The accumulator is pushed against the end 22 of the accumulator housing 2 that forms the gas side 20. This end 22 is closed, except for a port 24 for the working gas (preferably $N_2$). The low pressure-side end of the accumulator housing 2 is open in the direction of the atmosphere.

FIGS. 1 and 2 show that the accumulator housing 2 is a single piece component made, for example, by a deep drawing process. In this case, the wall thickness is adapted to the high pressure-side pressure level over the longitudinal section of the high pressure side 4 and changes at the end of the high pressure side 4 into a reduced wall thickness adapted to the pressure level of the low pressure side 6 that is much lower than that of the high pressure side. The intermediate piece 12 is secured on the inner wall of the inner cylinder at the respective end region of the high pressure side 4, thus on the end of the region of the accumulator housing 2 that still has the greater wall thickness.

In the rotational position of the accumulator housing 2 that is shown in FIG. 1, an opening 26 lying radially on the outside on the intermediate piece 12 is visible. This opening forms a fluid path to the high pressure-side fluid chamber 16 and fulfills another purpose, as explained in detail below in conjunction with FIGS. 6 and 7. In addition, a fluid path is in the intermediate piece 12. This fluid path leading to the low pressure-side fluid chamber 18 is not visible in the drawings of the housing 2 in FIGS. 1 and 2.

Figure 3:
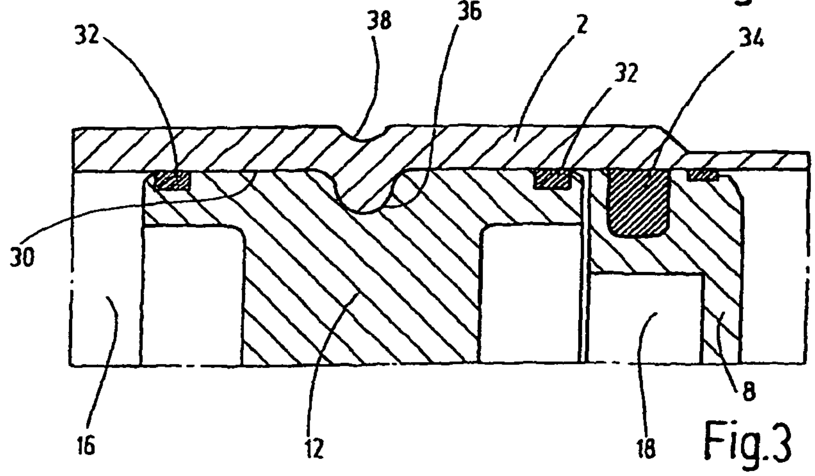

A number of exemplary embodiments of the positional securing of the intermediate piece 12 are explained with reference to FIGS. 3 to 7. The intermediate piece 12 forms, on the whole, an annular body with a radially external cylindrical surface 30 resting against the inner surface of the housing 2 and sealed off from the inner surface of the housing by seals 32. As self-evident, the accumulator pistons 8, 10 are also sealed off from the inner cylinder by the piston seals 34. FIG. 3 shows that the cylindrical surface 30 of the intermediate piece 12 has a depression 36 with which a notch 38, formed into the wall of the accumulator housing 2, engages to secure the intermediate piece 12.

Figure 4:
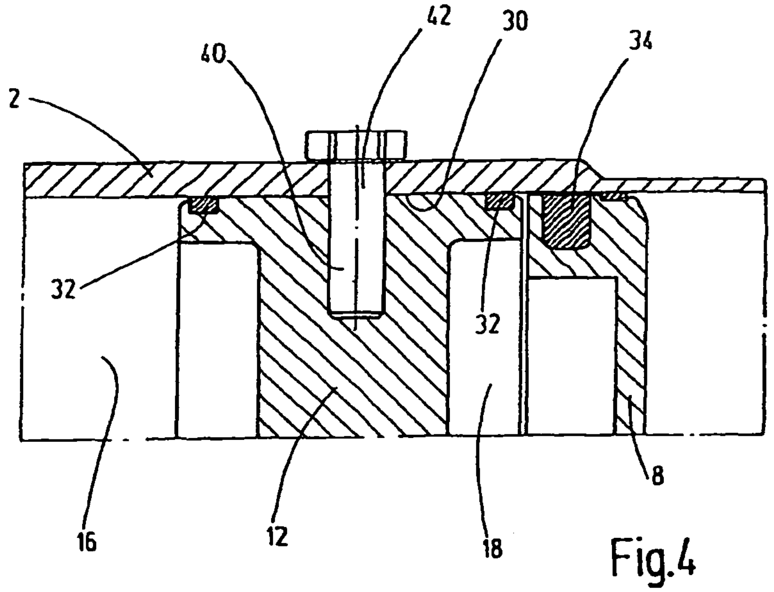
Figure 5:
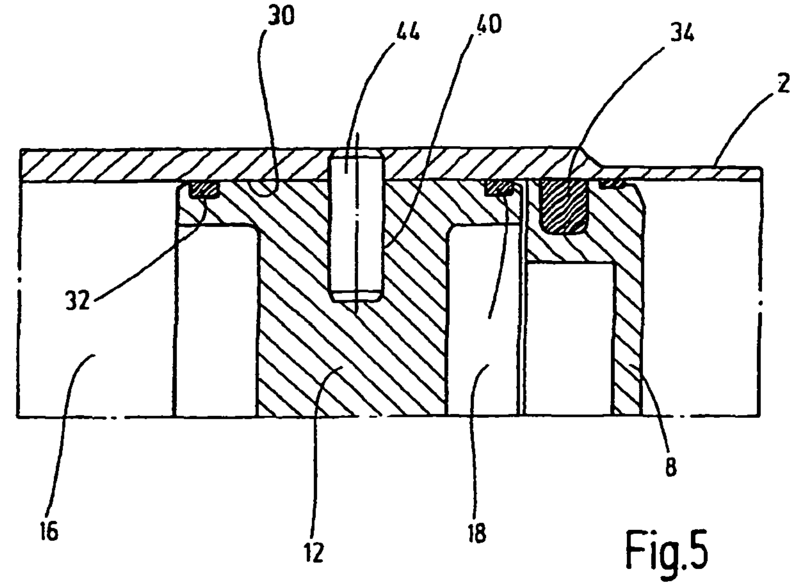

In contrast, FIGS. 4 and 5 show embodiments in which the cylindrical surface 30 of the intermediate piece 12 has radial boreholes 40. In FIG. 4, a mounting screw 42 penetrates the borehole 40. In FIG. 5 the mounting bolt 44 penetrates the borehole 40.

Figure 6:
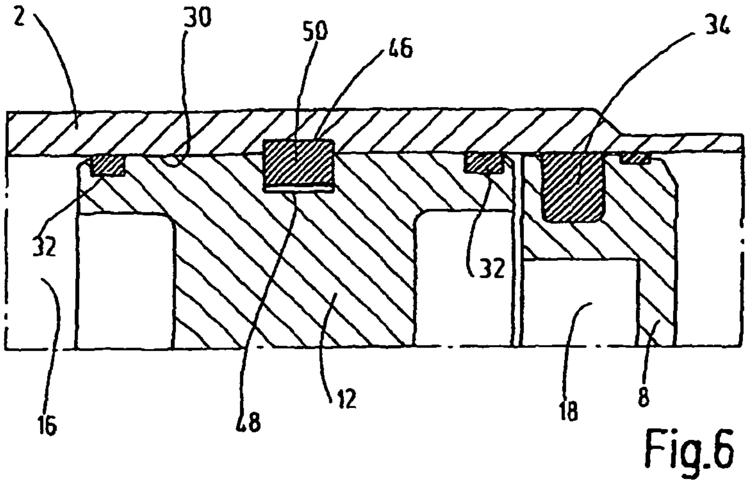
FIGS. 3 to 7 are enlarged top plan views in section of the area designated as A in FIG. 2, according to first, second, third, fourth and fifth exemplary embodiments of the invention, respectively.

FIG. 6 shows an embodiment in which the wall of the inner cylinder of the accumulator housing 2 has a depression 46 aligned with a depression 48 in the cylindrical outer surface 30 of the intermediate piece 12. In this configuration, the position of the intermediate piece 12 can be secured by an insert ring 50. In this case, the insert ring is a ring made of an elastically flexible material with sufficient strength, such as spring steel. The ring is slotted, i.e., not closed, so that the ring can be slid through the opening 26 (FIG. 1) and into the annular space formed by the aligned depressions 46 and 48.

Figure 7:
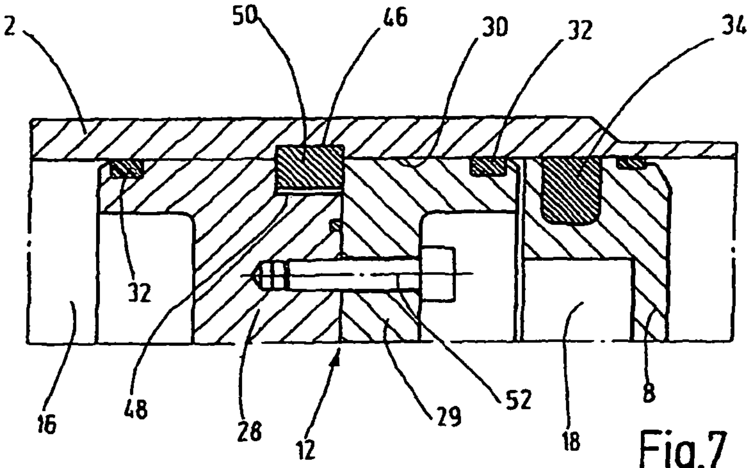

The major distinction between the example shown in FIG. 7 and the example shown in FIG. 6 lies in the fact that the annular body of the intermediate piece 12 of FIG. 7 has two annular body parts 28 and 29 connected together by a threaded joint 52. Body parts 28, 29 jointly define the radially external cylindrical surface 30. An insert ring 50 is used again for securing the intermediate piece 12 in the space formed by the depressions 46 and 48. However, the depression 48 in the annular body part 28 is designed such that it is open in the direction of the other annular body part 29 and is closed by this annular body part 29 when screwed together with the annular body part 28.

The invention is not limited to the depicted embodiments of the positional securing of the intermediate piece 12. Other attachment techniques, such as welding, adhesive cementing, or the like can be used.

While various embodiments have been chosen to illustrate the invention, it will be understood by those skilled in the art that various changes and modifications can be made therein without departing from the scope of the invention as defined in the appended claims.

What is claimed is:

1. A dual piston accumulator, comprising:

a single accumulator housing extending in an axial direction as a single piece over a high pressure component having a first wall thickness and a low pressure component having a second wall thickness, said first wall thickness being greater than said second wall thickness, said housing forming an inner cylinder extending continuously without a shoulder from said high pressure component to said low pressure component;

an actuator piston defining a high pressure-side chamber and a low-pressure side chamber in said housing, said accumulator piston having a common piston rod with piston members thereon, said piston members having equal piston diameters and being guided in said inner cylinder; and an intermediate piece bordering both of said chambers and separating said high pressure-side chamber from said low pressure-side chamber, said piston rod extending through said intermediate piece.

2. A dual piston accumulator according to claim 1 wherein said intermediate piece is fastened on an end region of said inner cylinder in a section of said housing with said first wall thickness.

3. A dual piston accumulator according to claim 1 wherein said intermediate piece comprises an annular body with a radially external cylindrical surface resting against an inner surface of said inner cylinder to form a seal and is connected with said inner cylinder at least at one attachment point.

4. A dual piston accumulator according to claim 1 wherein said intermediate piece comprises a radially external cylindrical surface having at least one depression engaged by a notch formed by a wall of said housing.

5. A dual piston accumulator according to claim 4 wherein said depression comprises an annular groove.

6. A dual piston accumulator according to claim 1 wherein said intermediate piece comprises a radially external cylindrical surface having at least one radial borehole, at least one of a mounting bolt and a mounting screw extending through said borehole and said housing.

7. A dual piston accumulator according to claim 1 wherein a wall of said inner cylinder and a radially external cylindrical surface of said intermediate piece each have a depression aligned with each other and engaging an insert ring.

8. A dual piston accumulator according to claim 1 wherein said intermediate piece comprises an annular body having annular first and second body parts that are screwed together, each of said annular body parts forming a part of a radially external cylindrical surface resting against said inner cylinder, a depression in said cylindrical surface of said first body part opening in a direction of said second body part and being closed by said second body part.

9. A dual piston accumulator, comprising:

a single accumulator housing extending in an axial direction in a single piece over a high pressure component having a first wall thickness and a low pressure component having a second wall thickness, said first wall thickness being greater than said second wall thickness;

an actuator piston defining a high-pressure side chamber and a low-pressure side chamber in said housing, said accumulator piston having a common piston rod with piston members thereon; and an intermediate piece bordering both of said chambers and separating said high pressure-side chamber from said low pressure-side chamber, said piston rod extending through said intermediate piece, said intermediate piece having an annular body with a radially external cylindrical surface resting against an inner surface of an inner cylinder of said housing to form a seal and being connected with said inner cylinder by at least one attachment point.

10. A dual piston accumulator according to claim 9 wherein said intermediate piece is fastened on an end region of said inner cylinder in a section of said housing with said first wall thickness.

11. A dual piston accumulator, comprising:

a single accumulator housing extending in an axial direction in a single piece over a high pressure component having a first wall thickness and a low pressure component having a second wall thickness, said first wall thickness being greater than said second wall thickness;

an actuator piston defining a high-pressure side chamber and a low-pressure side chamber in said housing, said accumulator piston having a common piston rod with piston members thereon; and an intermediate piece bordering both of said chambers and separating said high pressure-side chamber from said low pressure-side chamber, said piston rod extending through said intermediate piece, said intermediate piece having a radially external cylindrical surface with at least one depression engaged by a notch formed in a wall of said housing.

12. A dual piston accumulator according to claim 11 wherein said depression comprises an annular groove.

13. A dual piston accumulator according to claim 11 wherein said intermediate piece is fastened on an end region of said inner cylinder in a section of said housing with said first wall thickness.

14. A dual piston accumulator, comprising a single accumulator housing extending in an axial direction in a single piece over a high pressure component having a first wall thickness and a low pressure component having a second wall thickness, said first wall thickness being greater than said second wall thickness;

an actuator piston defining a high-pressure side chamber and a low-pressure side chamber in said housing, said accumulator piston having a common piston rod with piston members thereon;

an intermediate piece bordering both of said chambers and separating said high pressure-side chamber from said low pressure-side chamber, said piston rod extending through said intermediate piece, said intermediate piece having a radially external cylindrical surface with at least one radial borehole; and at least one of a mounting bolt and a mounting screw extending through said borehole and said housing.

15. A dual piston accumulator according to claim 14 wherein said intermediate piece is fastened on an end region of said inner cylinder in a section of said housing with said first wall thickness.

16. A dual piston accumulator, comprising:

a single accumulator housing extending in an axial direction in a single piece over a high pressure component having a first wall thickness and a low pressure component having a second wall thickness, said first wall thickness being greater than said second wall thickness, said housing having an inner cylinder;

an actuator piston defining a high-pressure side chamber and a low-pressure side chamber in said housing, said accumulator piston having a common piston rod with piston members thereon;

an intermediate piece bordering both of said chambers and separating said high pressure-side chamber from said low pressure-side chamber, said piston rod extending through said intermediate piece; and a wall of said inner cylinder and a radially external surface of said intermediate piece each having a depression aligned with each other and engaging an insert ring.

17. A dual piston accumulator according to claim 16 wherein said intermediate piece is fastened on an end region of said inner cylinder in a section of said housing with said first wall thickness.

18. A dual piston accumulator, comprising:

a single accumulator housing extending in an axial direction in a single piece over a high pressure component having a first wall thickness and a low pressure component having a second wall thickness, said first wall thickness being greater than said second wall thickness, said housing having an inner cylinder;

an actuator piston defining a high-pressure side chamber and a low-pressure side chamber in said housing, said accumulator piston having a common piston rod with piston members thereon; and an intermediate piece bordering both of said chambers and separating said high pressure-side chamber from said low pressure-side chamber, said piston rod extending through said intermediate piece, said intermediate piece including an annular body having annular first and second body parts screwed together, each of said annular body parts forming a radially external cylindrical surface resting against said inner cylinder, a depression in said cylindrical surface of said first body part opening in a direction of said second body part and being closed by said second body part.

19. A dual piston accumulator according to claim 18 wherein said intermediate piece is fastened on an end region of said inner cylinder in a section of said housing with said first wall thickness.

* * * * *